United States Patent [19]

Malson, Sr.

[11] 4,377,212

[45] Mar. 22, 1983

[54] PENDULUM ACTION CULTIVATING HOE

[76] Inventor: John R. Malson, Sr., 100 Toni Dr., Jacksonville, N.C. 28540

[21] Appl. No.: 338,420

[22] Filed: Jan. 11, 1982

[51] Int. Cl.³ .............................................. A01B 1/08
[52] U.S. Cl. ................................................... 172/376
[58] Field of Search ............... 172/371, 372, 373, 374, 172/375, 376, 377

[56] References Cited

U.S. PATENT DOCUMENTS

| | | | |
|---|---|---|---|
| 1,080,842 | 12/1913 | Molkenthin | 172/372 |
| 2,064,063 | 12/1936 | Hall | 172/376 |
| 3,164,213 | 1/1965 | Lutz | 172/375 |

FOREIGN PATENT DOCUMENTS

| | | | |
|---|---|---|---|
| 606411 | 12/1934 | Fed. Rep. of Germany | 172/372 |
| 912761 | 12/1962 | United Kingdom | 172/374 |
| 1502968 | 3/1978 | United Kingdom | 172/377 |

Primary Examiner—Richard T. Stouffer
Attorney, Agent, or Firm—B. B. Olive

[57] ABSTRACT

A pendulum action cultivating hoe utilizes an elongated handle on the lower end of which is mounted a vertically inverted U-shaped support frame. The support frame pivotally mounts a second upright vertically positioned U-shaped blade frame having a blade portion which is drawn back and forth through the soil to be cultivated and whose motion is limited by a rod member mounted between the side arms of the frames.

2 Claims, 5 Drawing Figures

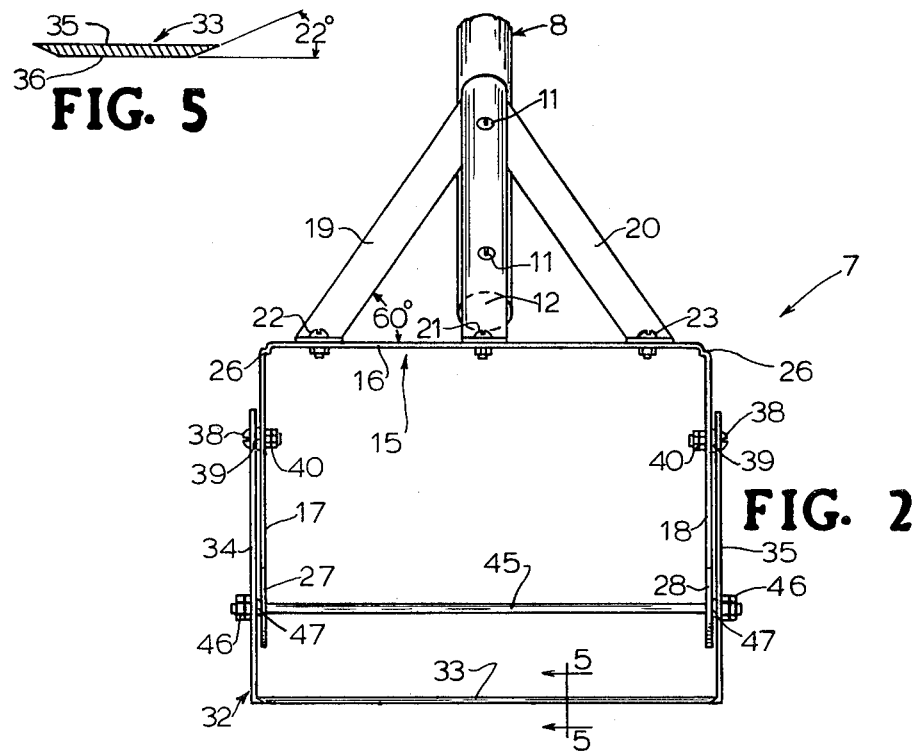
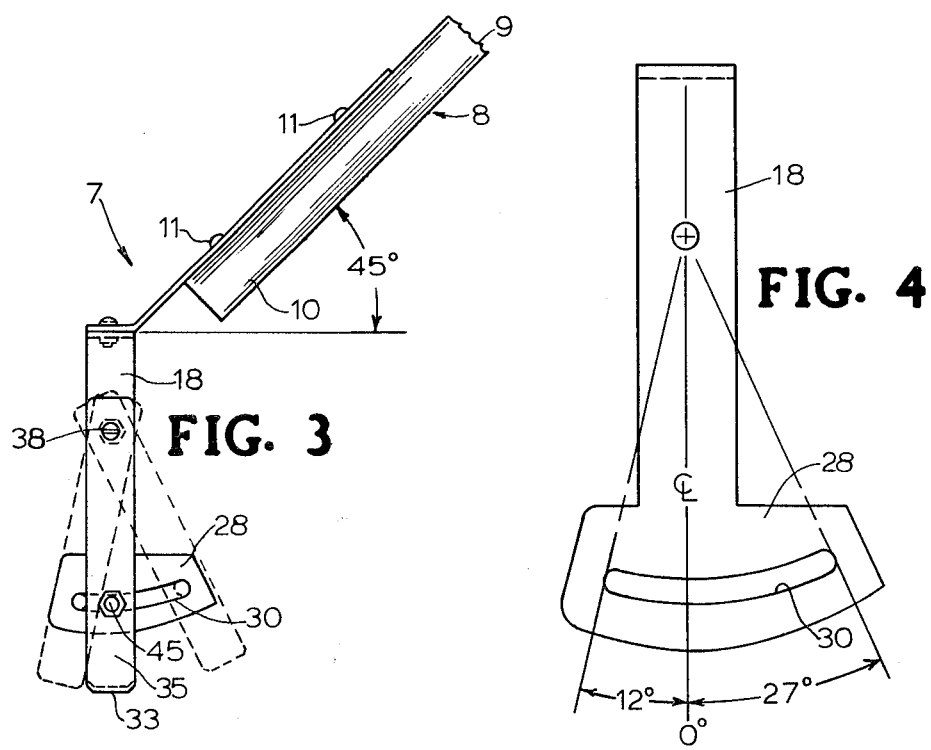

PENDULUM ACTION CULTIVATING HOE

TECHNICAL FIELD

The present invention relates to manually manipulated cultivating tools and particularly to improvements in hoe-type tools which utilize a pendulum action.

BACKGROUND ART

Hand cultivating tools such as the hoe are well known for working the soil in gardens, around shrubbery, and the like. A cultivating hoe having a so-called pendulum action and offering certain advantages over the conventional hoe has been known in the past. U.S. Pat. No. 2,943,690 is illustrative of the type tool with which the present application is concerned.

DISCLOSURE OF THE INVENTION

A pendulum action cultivating hoe for working soil in gardens, and the like, comprises an inverted U-shaped support frame having a horizontal cross arm and integral opposed vertical side arms. The cross arm extends transverse of and is attached to an elongated, round handle such as employed in a conventional hoe or rake. The metal plate of which the support frame is formed is shaped at the opposed lower ends of the support frame side arms to provide opposed arcuate slots.

An upright, vertically positioned U-shaped blade frame having a horizontal cross arm which serves as a blade and vertical side arms has the respective upper ends of its side arms pivotally attached to the mating side arms of the support frame thereby enabling the blade frame to pivot back and forth on the support frame. A horizontal rod passes through and fits loosely in the arcuate slots and is rotatably joined at its ends to the side arms of the blade frame. The rod serves to limit the back and forth swinging motion of the blade frame on the support frame and serves other functions more fully described in the description. The cross arm of the blade frame is upwardly beveled on each of its edges to assist in working the soil during the pendulum action associated with use of the invention tool.

BRIEF DESCRIPTION OF THE DRAWINGS

FIG. 2 is a front elevation view of the hoe.

FIG. 3 is a side elevation view of the hoe and illustrating in dashed lines the forward and rearward hoe positions.

FIG. 4 is an enlarged side elevation view of one of the side arms of the support frame employed with the invention.

FIG. 5 is an enlarged cross section view taken substantially along line 5—5 of FIG. 2.

BEST MODE FOR CARRYING OUT THE INVENTION

Figure 1:
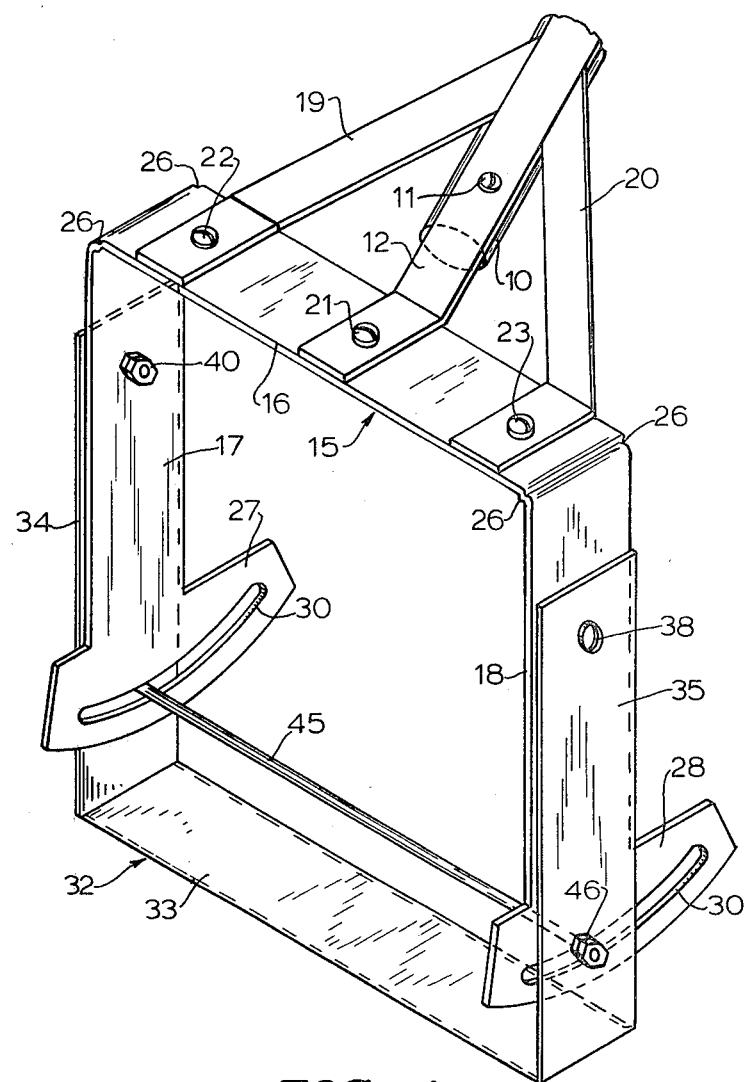
FIG. 1 is a perspective view of the cultivating hoe of the invention.

With reference to the drawings, the pendulum action cultivating hoe of the invention is generally designated 7 and includes an elongated round handle 8 having an upper portion 9 and lower portion 10. The lower portion 10 of handle 8 is attached by bolts 11 to a central rigid metal strap 12 and is otherwise attached in transverse relation to an integral inverted U-shaped rigid support frame 15 formed by a cross arm 16 and opposed side arms 17, 18. For this purpose, strap 12 is illustrated as being attached to the top plane and center of cross arm 16 by means of bolt 21. It will also be noted that two diagonal metal straps or braces 19, 20 converge at 60° (FIG. 2) upward from near the outer edges of the top plane of cross bar 16 to which they are respectively attached by bolts 22, 23. Diagonal braces 19, 20 converge with strap 12 at their upper end and are secured to strap 12 by means of welding. Support frame 15 is preferably made of a relatively heavy, e.g., 0.125 inch thick, malleable strap iron and is preferably formed with appropriate depressions 26 at the outer ends of cross arm 16 for purposes of strength. The lower ends 27, 28 of the side arms 17, 18 of support frame 15 are illustrated as being in a boot-like shape and provided with upwardly curved slots 30 which are utilized as later described. FIG. 3 shows handle 8 at a 45° angle.

A rigid upright, vertically positioned U-shaped, earth-engaging blade frame 32 comprises cross arm 33 which serves as a blade and opposed upwardly-extending side arms 34, 35. Blade frame 32, like support frame 15, is preferably made of malleable strap iron but of less thickness, e.g., 0.075 inch, than used for support frame 15. Cross arm 33 serves as a blade and, as best illustrated in FIG. 5, has on each of its long edges an upward beveled cutting edge, preferably at 22°, and with a flat top surface 35 and flat bottom surface 36. The cutting blade 33 may be heat treated for longer lasting sharpness and resistance to wear.

The upper ends of side arms 34, 35 of blade frame 32 are mounted in close, opposing relation and are pivotedly attached to the upper ends of side arms 17, 18 of support frame 15 by means of bolts 38, washers 39, and double hex nuts 40 thereby enabling blade frame 32 to pivot back and forth on support frame 15 in a pendulum-like action. Side arms 17, 18 during this action also serve as means for opposing any tendency for side arms 34, 35 to bend or shift laterally. A cross rod 45 passes through the arcuate slots 30 in the boot portions 27, 28 of side arms 17, 18 of support frame 15. Rod 45 is positioned at its outer ends by means of double hex nuts 46 and which prevent lateral axial movement of rod 45 once installed. Washers 47 separate and provide sliding surfaces between the boot portions 27, 28 of side arms 17, 18 of support frame 15 and the mating portions of side arms 34, 35 of blade frame 32 to which the outer ends of cross rod 45 are attached. Washers 47 also serve to cover the holes in the respective side arms 17, 18 and 34, 35 through which rod 45 passes which is particularly useful in wet soil conditions. In a preferred form, slots 30 and the holes through which rod 45 passes are sufficiently large to allow rod 45 to rotate as it swings back and forth in slots 30, the extreme ends of which, of course, limit the desired pendulum action in both directions as in FIG. 3. As further illustrated in FIG. 4, slots 30 are shaped so as to permit approximately 12° forward motion and approximately 27° backward motion with respect to the center lines of the respective side arms 17, 18 of support frame 15.

In use, the invention hoe is synchronized with natural body and arm motions and uses the cross rod 45 as a means for controlling and gauging depth. Thus, plants such as peanuts, potatoes, and tuberous flowers can be cultivated without damage as the season progresses. Rod 45 also serves the very useful purpose of bending high grass and weeds during the cultivating operation which is typically toward the weeded or other areas to be cultivated. Due to its loose fitting relation and constantly turning motion, cross bar 45 can furthermore serve in both directions of swing as a type of roller bearing. Furthermore, it has been found that by limiting the movement of blade 33 to approximately 27° from the center line of side arms 17, 18 of support frame 15 when handle 8 is pushed forward and to approximately 12° when handle 8 is pulled backwards, a natural movement akin to body movement is achieved. As the operator progresses forward toward the weeded or other area to be cultivated, footsteps will inevitably be left on the cultivated soil. However, such footsteps can be readily removed by using the invention tool as a rake to which it is readily adapted. Furthermore, by providing a fixed pair of side arms adjacent a pivotal pair of side arms an overall sturdy tool has been achieved.

Outward mounting of the blade frame side arms on the support frame means also enables the bottom cutting edges of the blade frame to cut closer to plants and areas near encircling obstacles such as fences, sidewalks and the like. Further, by providing edges on both sides of the blade frame, the blade can slice or glide in either direction dependent on the direction of movement thereby conserving energy of the user and allowing a greater area to be covered in less time.

I claim:

1. A hand-operated, pendulum action, cultivating hoe comprising:
   (a) an elongated handle;
   (b) an integral, vertically inverted, U-shaped, rigid support frame formed of plate metal comprising:
      (i) a horizontal cross strap; and
      (ii) a pair of similar shaped, downwardly-extending, laterally-spaced, opposed vertical side straps, the upper end portion of each said vertical side strap being formed as a strap-like continuation of one end of said cross strap and the lower end portion of each said vertical side strap being formed as a plate section in the same plane as the plane of and as an enlarged extension of the upper end portion of the vertical side strap of which it is a part and having an upwardly-curved arcuate slot formed therein;
   (c) bracing means integrally connecting said elongated handle to said support frame cross strap in transverse perpendicular relation thereto and vertically angled such that when said support frame vertical side straps are vertical said handle is at a substantially 45° vertical angle with respect to the horizontal;
   (d) an integral, upright, vertically-positioned, U-shaped, rigid blade frame formed of metal strap, said blade frame comprising:
      (i) a rectangular, ground-engaging, horizontal cross strap providing a blade member having forward and rearward upwardly beveled cutting edges formed on the long edges thereof; and
      (ii) a pair of similar shaped, upwardly extending, laterally spaced, opposed vertical side straps, said blade frame vertical side straps being formed as respective strap-like continuations of the ends of said cross strap blade member and being pivotally mounted at their upper ends outwardly of and on the upper end portions of said support frame vertical side straps, said blade frame vertical side straps being arranged to swing on said support frame vertical side straps with the respective mating vertical side strap surfaces, including the surfaces of said support frame vertical side strap plate sections mating with said blade frame vertical side straps being in close opposing relation; and
   (e) a horizontal cross bar extending between said blade frame vertical side straps and mounted with each respective outer end thereof passing through a respective said arcuate slot in a respective said support frame vertical side strap plate section and through a respective lower end of a said blade frame vertical side strap, said cross bar having means on the outermost ends thereof to prevent lateral axial movement thereof and residing at an elevated position above said blade frame blade member so that during use of said hoe and as said blade frame pivots on said support frame proximate the top thereof, said cross bar moves at said elevated position forward and rearward in said arcuate slots enabling said ground-engagable blade member to have limited off-center bidirectional swing on said support frame and dig into and cultivate the soil being hoed and said cross bar to serve as a depth gauge therefor in a selected short or long sweep synchronized with the natural pendulus motion of the arms of the user and said support frame vertical side straps serve to stabilize and oppose lateral movement of said blade frame vertical side straps.

2. A hand-operated, pendulum action hoe as claimed in claim 1 wherein:
   (a) said slots and plate sections are formed such that with respect to the centerline of the upper end portions of said support frame vertical side straps, said bar is limited to movement between approximately 12° forward and approximately 27° rearward of said centerline; and
   (b) said bar is mounted in a manner enabling said bar to rotate during the forward and backward movements of said blade frame.

* * * * *